(12) United States Patent
Fukuda et al.

(10) Patent No.: US 7,706,125 B2
(45) Date of Patent: *Apr. 27, 2010

(54) MULTILAYER CERAMIC CAPACITOR AND PRODUCTION METHOD OF THE SAME

(75) Inventors: Daisuke Fukuda, Kirishima (JP); Kiyoshi Matsubara, Kirishima (JP); Masahiro Nishigaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 155 days.

This patent is subject to a terminal disclaimer.

(21) Appl. No.: 11/909,713

(22) PCT Filed: Mar. 17, 2006

(86) PCT No.: PCT/JP2006/305354
§ 371 (c)(1),
(2), (4) Date: Sep. 25, 2007

(87) PCT Pub. No.: WO2006/103954
PCT Pub. Date: Oct. 5, 2006

(65) Prior Publication Data
US 2009/0059471 A1    Mar. 5, 2009

(30) Foreign Application Priority Data
Mar. 25, 2005    (JP) .............................. 2005-088396

(51) Int. Cl.
H01G 4/06    (2006.01)

(52) U.S. Cl. ..................................... 361/311; 29/25.42

(58) Field of Classification Search ................. 361/311, 361/321.1, 321.2, 321.3, 321.4, 321.5; 29/25.42
See application file for complete search history.

(56) References Cited

U.S. PATENT DOCUMENTS

| | | | |
|---|---|---|---|
| 6,839,221 B2 | 1/2005 | Sugimoto et al. | |
| 7,020,941 B2 * | 4/2006 | Chazono et al. | ............. 29/25.41 |
| 7,433,173 B2 * | 10/2008 | Iwasaki et al. | ............ 361/321.4 |
| 2001/0036054 A1 * | 11/2001 | Chazono et al. | .......... 361/321.2 |
| 2004/0110357 A1 * | 6/2004 | Chazono et al. | ............. 438/396 |
| 2004/0233612 A1 | 11/2004 | Sugimoto et al. | |

FOREIGN PATENT DOCUMENTS

| | | |
|---|---|---|
| CN | 1525503 A | 9/2004 |
| JP | 2003-040671 | 2/2003 |
| JP | 2003-068559 | 3/2003 |
| JP | 2004-221268 | 8/2004 |
| JP | 2005-026342 | 1/2005 |

OTHER PUBLICATIONS

Chinese language office action and its English language translation for corresponding Chinese application 200680009583.8 lists the references above.

* cited by examiner

Primary Examiner—Eric Thomas
(74) Attorney, Agent, or Firm—Hogan & Hartson LLP

(57) ABSTRACT

The invention provides a multilayer ceramic capacitor comprising a capacitor body composed by alternately layering dielectric layers and inner electrode layers. Accordingly, the multilayer ceramic capacitor has high relative permittivity and is high the temperature property and highly accelerated life test property.

8 Claims, 4 Drawing Sheets (a)

(b)

(a)

(b)

(c-1)

(c-2)

MULTILAYER CERAMIC CAPACITOR AND PRODUCTION METHOD OF THE SAME

TECHNICAL FIELD

The invention relates to a multilayer ceramic capacitor and a production method of the capacitor, particularly to a multilayer ceramic capacitor comprising a dielectric layer formed by adding a glass component to a dielectric material and having a compact size and high capacity and high reliability, and a production method of the capacitor.

BACKGROUND ART

In recent years, along with wide spread of mobile appliances such as cell phones and high speed and high frequency of semiconductor devices which are main parts of personal computers, a multilayer ceramic capacitor to be disposed in such electronic appliances has been required to be smaller and have higher capacities. Therefore, a dielectric layer composing the multilayer ceramic capacitor has been made thinner and to have higher lamination.

For example, with respect to a dielectric powder composing a dielectric ceramic, Patent Document No. 1 discloses that a barium titanate powder (BCT (Barium Calcium titanate) powder) in which a portion of A site is replaced with Ca and a barium titanate powder (BT powder) containing no substituent Ca are used in form of a mixture, so that the fine granulation and relative permittivity improvement of the above-mentioned barium titanate crystal particles can be accomplished in the dielectric layer after sintering and at the same time DC bias property can be improved.

In this connection, when being mixed and sintered with added components such as Mg, rare earth elements, etc., which are indispensable for controlling temperature property of the relative permittivity, the BCT crystal particles among the barium titanate crystal particles composing the dielectric ceramic disclosed in Patent Document No. 1 tend to cause grain growth along with diffusion of Ca contained in BCT powder. Therefore, severe condition control is needed for sintering and particularly in the case of using raw materials having particle diameters of sub-micron level or smaller, it has been known well that rather considerable grain growth is caused and production of a sintered body composed of fine particles of barium titanate crystal is not easy.

Therefore, in the above-mentioned Patent Document No. 1, to suppress the grain growth of BCT crystal particles at the time of sintering, $MnCO_3$, MgO, and a rare earth oxide are added further when a BT powder coated with oxides of Mg and rare earth elements and a BCT powder are mixed and accordingly, a coating layer of a highly insulating compounded oxide can be formed approximately evenly on the surfaces of the BT type crystal particles after sintering and at the same time excess solid solution formation and grain growth of Mg and the rare earth element in the BCT crystal particles.

According to the production method described in the above-mentioned Patent Document No. 1, in the case of using a small scale experimental sintering furnace in which the sintering temperature can be precisely controlled, even if a technique of further adding $MnCO_3$, MgO, and a rare earth oxide is employed at the time of mixing the above-mentioned BT powder coated with Mg and a rare earth oxide and a BCT powder, it is made possible to form a sample which is provided with a desired relative permittivity and temperature property and satisfactory in a highly accelerated life test.

However, in the control level of the sintering temperature in a tunnel type large-scale sintering furnace just like the one to be used for mass production of multilayer ceramic capacitors, fluctuation of the highest temperature in the sintering furnace is considerably significant at the time of sintering and therefore, the dispersion of the grain growth of BCT crystal particles becomes wide and many products whose relative permittivity, temperature property, and highly accelerated life test property are out of the satisfactory ranges are produced to result in a problem that the yield of mass production is decreased.

Patent Document No. 1: Japanese Unexamined Patent Publication No. 2003-40671

DISCLOSURE OF THE INVENTION

Problems to be Solved by the Invention

The object of the invention is to provide a multilayer ceramic capacitor having a high relative permittivity and excellent in a temperature property and a highly accelerated life test property with suppressed grain growth of crystal particles even in mass production using a tunnel type large-scale sintering furnace, and a production method of the capacitor.

Means for Solving the Problems

The present inventors have made various investigations to solve the above-mentioned problems and accordingly have found that if (a) a dielectric layer of a multilayer ceramic capacitor comprises a plurality of crystal particles and grain boundary phases comprising interfacial grain boundaries and triple point grain boundaries formed among a plurality of the crystal particles adjacent to one another, and if (b) a Si—Ba—O compound is formed in 5% or more of the triple point grain boundaries in entire triple point grain boundaries per unit surface area of the dielectric layer, a multilayer ceramic capacitor having a high relative permittivity and excellent in a temperature property and a highly accelerated life test property can be obtained and the findings have now led to completion of the invention.

That is, a multilayer ceramic capacitor of the invention comprising a capacitor body composed by alternately layering dielectric layers and inner electrode layers, wherein each of said dielectric layers comprises the following conditions (a) and (b): (a) comprising a plurality of crystal particles, and grain boundary phases comprising interfacial grain boundaries and triple point grain boundaries formed among a plurality of the crystal particles adjacent to one another; and (b) Si—Ba—O compound being formed in 5% or more of the triple point grain boundaries in the entire triple point grain boundaries per unit surface area of the dielectric layer.

A method for producing a multilayer ceramic capacitor, which comprises sintering a green body of a capacitor body composed by alternately layering green sheets containing a dielectric powder and an organic resin, and inner electrode patterns, wherein the dielectric powder is obtained by adding 0.7 to 2 parts by mass of glass containing 0.1% by mass or less of alumina, and 0.01 to 1 parts by mass of barium oxide to 100 parts by mass of a mixing powder of a perovskite type barium titanate powder (BCT powder) wherein a portion of A site is replaced with Ca, and a perovskite barium titanate powder (BT powder) containing no substituent Ca, and mixed with oxides of Mg, rare earth elements and Mn.

Effects of the Invention

Generally, the glass components and additive components to be added together with a dielectric material are for controlling the sintering property and dielectric property of a dielectric ceramic. However, in the case a glass component exists excessively in the interfacial grain boundaries of crystal particles, the glass component decreases the property as a ferroelectric material of the crystal particles and partially decreases the insulating property of the grain boundary phase.

In the invention, since the Si—Ba—O compound is formed in 5% or more of triple point grain boundaries among entire triple point grain boundaries per unit surface area of the dielectric layer in the dielectric layer, the glass component and the additive component added together with the dielectric material are made to exist together locally in the triple point grain boundaries in the dielectric layer and existence of an excess amount of the glass component in the interfacial grain boundaries can be suppressed, and accordingly, the property as a ferroelectric material of the crystal particles can be improved and the insulation property of the grain boundary phase can be increased. As a result, the relative permittivity, temperature property, and highly accelerated life test property of the multilayer ceramic capacitor can be improved.

Further, due to the above-mentioned configuration of the dielectric layer, even in the case of mass production of multilayer ceramic capacitors by using a tunnel type large-scale sintering furnace in which fluctuation of the highest temperature for sintering is high, the above-mentioned relative permittivity, temperature property, and highly accelerated life test property can be stabilized and the yield can be increased.

BRIEF DESCRIPTION OF THE DRAWINGS

FIG. 4 FIG. 4A is a graph showing one example of the evaluation result of the grain boundary resistance in a dielectric layer of one embodiment of the invention by an alternating current impedance method, and FIG. 4B is a schematic illustration showing an equivalent circuit to be used for analysis of the alternating current impedance method.

PREFERRED EMBODIMENTS FOR CARRYING OUT THE INVENTION

<Multilayer Ceramic Capacitor>

Figure 1:
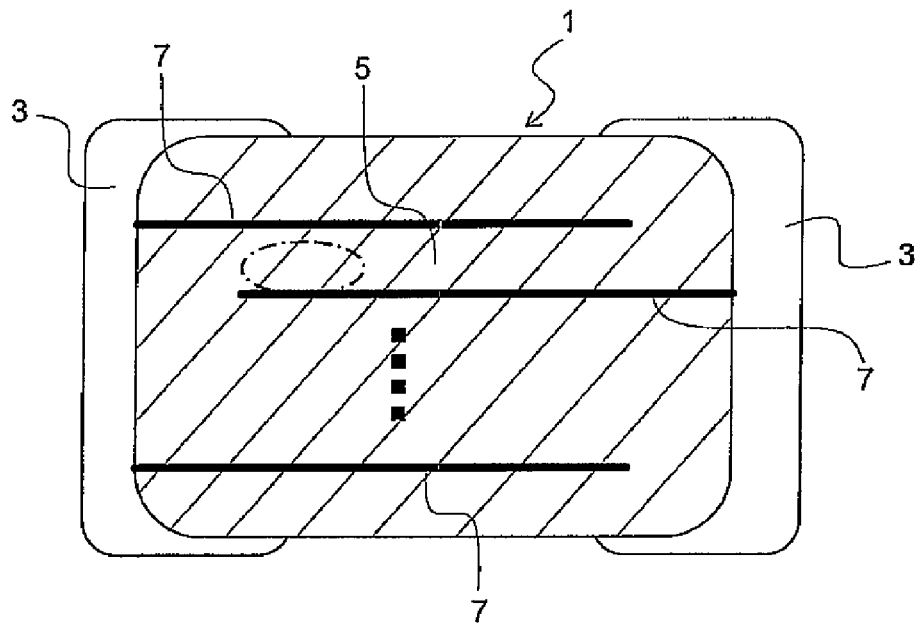
FIG. 1 A schematic cross-sectional view of a multilayer ceramic capacitor of one embodiment of the invention.
Figure 2:
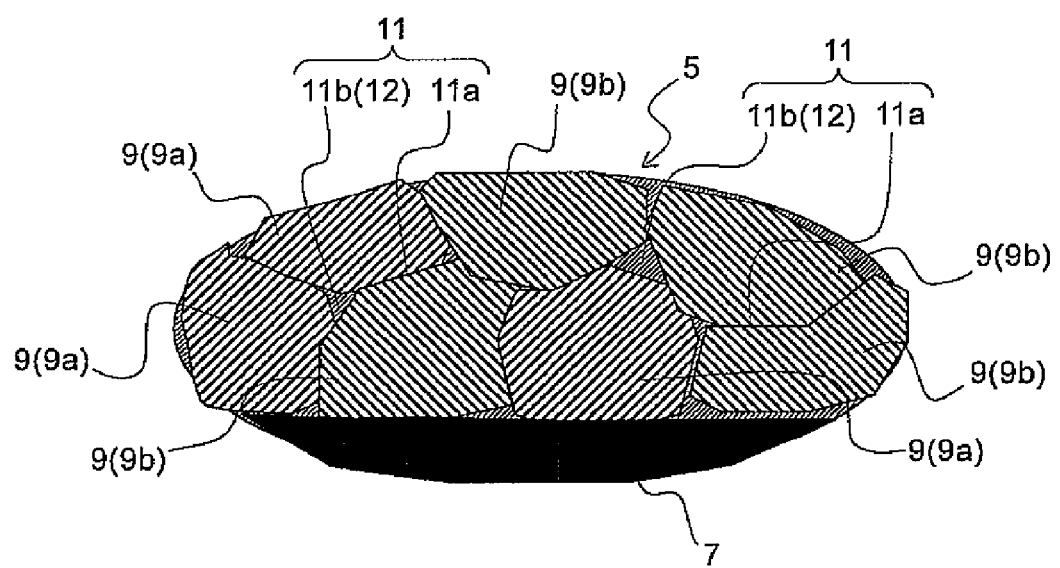
FIG. 2 A magnified partial cross-sectional view of a region surrounded by a dashed dotted line in FIG. 1.

Hereinafter, a multilayer ceramic capacitor of one embodiment of the invention will be described in detail with reference to drawings. FIG. 1 is a schematic cross-sectional view of a multilayer ceramic capacitor of the embodiment of the invention. FIG. 2 is a magnified partial cross-sectional view of a region surrounded by a dashed dotted line in FIG. 1 and shows the crystal particles composing the dielectric layer, and grain boundary phases.

As shown in FIG. 1, the multilayer ceramic capacitor according to the embodiment comprises a capacitor body 1 and outside electrodes 3 in both end parts. The outside electrodes 3 are formed by baking a copper (Cu) paste or a Cu and nickel (Ni) alloy paste.

The capacitor body 1 is composed by alternately layering dielectric layers 5 and inner electrode layers 7. The thickness of the capacitor body 1 is preferably 3 μm or thinner and preferably 2.5 μm or thinner. Accordingly, the multilayer ceramic capacitor can be made compact and have a high capacity. In terms of the stabilization of the fluctuation of the electrostatic capacity and capacity temperature property, the thickness dispersion of the dielectric layers 5 is preferably within 10%.

The metal composing the inner electrode layers 7 is desirably a base metal such as Ni, Cu, or the like for suppression of the production cost even in the case of multi-layer lamination and especially, Ni is desirable since simultaneous sintering with the dielectric layers 5 is made possible.

Herein, as shown in FIG. 2, the following is important. That is, each dielectric layer 5 of this embodiment is composed of the crystal particles 9 and grain boundary phases 11; the grain boundary phases 11 are composed of interfacial grain boundaries 11a where two crystal particles 9 adjoin each other and triple point grain boundaries 11b where three or more crystal particles 9 adjoin one another; the Si—Ba—O compound 12 is formed in the triple point grain boundaries 11b; and the ratio of the triple point grain boundaries 11b where the Si—Ba—O compound 12 exists is 5% or more in the entire triple point grain boundaries per unit surface area of the dielectric layers 5.

If the dielectric layers 5 are configured as described above, the glass component and additive component are made to exist together locally in the triple point grain boundaries 11b in the dielectric layers 5 and existence of an excess amount of the glass component in the interfacial grain boundaries 11a can be suppressed. As a result, the property as a ferroelectric material of the crystal particles 9 can be improved and the insulation property of the grain boundary phases 11 can be increased. The upper limit of the ratio of the triple point grain boundaries 11b where the Si—Ba—O compound 12 exists is 40% or less in the entire triple point grain boundaries per unit surface area of the dielectric layers 5.

On the other hand, if the dielectric layers 5 are not configured as the prescribed conditions, the above-mentioned effects cannot be caused. For example, if the Si—Ba—O compound 12 is not formed in 5% or more triple point grain boundaries in the entire triple point grain boundaries per unit surface area of the dielectric layers 5, and exists almost evenly in the interfacial grain boundaries 11a and the peripheral parts of the crystal particles 9, the relative permittivity and the insulation property of the dielectric layers are decreased and defects tend to be caused at a highly accelerated life test.

That each dielectric layer 5 comprises a plurality of crystal particles 9 and grain boundary phases 11 composed of interfacial grain boundaries 11a and triple point grain boundaries 11b formed among the plurality of the crystal particles 9 adjacent to one another and that the Si—Ba—O compound 12 is formed in 5% or more triple point grain boundaries 11b in the entire triple point grain boundaries per unit surface area of the dielectric layers 5 can be confirmed, for example, as described below, by analysis using a transmission emission microscope and an energy dispersive x-ray spectroscopy (EDS) Practically, it is determined that the Si—Ba—O compound 12 exists in the triple point grain boundaries 11b in the case the existence of crystal phases 11 is confirmed in the magnified level by the transmission electron microscope. The element analysis of the interfacial grain boundaries 11a is carried out at every 5 nm interval in the perpendicular direction and the detection limit of EDS is the concentration detection limit of the element existence.

In this embodiment, in unit surface area of the dielectric layers 5, the ratio ($C_2/C_1$) of the Si concentration $C_1$ in the interfacial grain boundaries ha and the Si concentration $C_2$ in the triple point grain boundaries 11b is preferably 2 or higher. Accordingly, the insulation property of the grain boundary phases 11 can be improved. The upper limit of the above-mentioned ratio ($C_2/C_1$) is preferably 2.4 or lower.

The crystal particles 9 are preferably of a dielectric material such as barium titanate having a perovskite type crystal structure. Particularly, perovskite type barium titanate crystal particles with different Ca component concentrations are preferable. That is, as shown in FIG. 2, it is preferable for the crystal particles 9 to contain perovskite type barium titanate crystal particles (BCT crystal particles) 9a in which a portion of A site is replaced with Ca and perovskite type barium titanate crystal particles (BT crystal particles) 9b containing no substituent Ca. That is, the crystal particles 9 contain BCT crystal particles 9a and BT crystal particles 9b and owing to coexistence of these two kinds of crystal particles 9, high properties can be shown.

Particularly, with respect to barium titanate composing the crystal particles 9, in the case barium or barium and Ca is defined as A site and titanium is defined as B site, it is preferable that the A/B ratio by mole satisfies A/B$\geq$1.003. With respect to conventional BCT crystal particles 9a, if Mg and a rare earth element are mixed, it is said that the grain growth tends to be caused following the dispersion of Ca, however in this embodiment, the A/B ratio by mole of the barium calcium titanate (BCT crystal particles) is defined as described above, so that the grain growth of the BCT crystal particles 9a can be suppressed. The upper limit of the above-mentioned A/B ratio by mole is preferably 1.006 or lower.

Further, the perovskite type barium titanate crystal particles are preferably composed of BT crystal particles 9b with Ca component concentration of 0.2% by atom or lower and BCT crystal particles 9a with a Ca component concentration of 0.4% by atom or higher and in the case barium or barium and Ca is defined as A site and titanium is defined as B site in said BCT crystal particles 9a, it is preferable that the A/B ratio by mole satisfies A/B$\geq$1.003. Accordingly, the grain growth of the BCT crystal particles 9a can be suppressed. Particularly, to keep the function of the BCT crystal particles 9a as a ferroelectric material with a high relative permittivity, barium titanate crystal particles with a Ca component concentration of 0.5 to 2.5% by atom are preferable. The upper limit of the above-mentioned A/B ratio by mole is preferably 1.006 or lower.

The BCT crystal particles 9a, which are crystal particles composing the crystal particles 9 are, as described above, perovskite type barium titanate in which a portion of A site is replaced with Ca and defined ideally as $(Ba_{1-x}Ca_x)TiO_3$. The Ca substitution amount at the A site in the above-mentioned BCT crystal particles 9a is preferably x=0.01 to 0.2 and particularly preferably x=0.02 to 0.07. It is because if the Ca substitution amount is within the range, the phase transition point near a room temperature is sufficiently shifted to a low temperature side and owing to the coexistence with the BT crystal particles 9b, superior temperature property and DC bias property can be attained in a temperature range for using as the capacitor.

On the other hand, BT crystal particles 9b are of perovskite type barium titanate containing no substituent Ca and defined ideally as $BaTiO_3$. The BT crystal particles 9b in this embodiment have the Ca concentration of 0.2% by atom or lower as an analyzed value.

In evaluation based on the index defined for the above-mentioned Ca concentration, the BCT crystal particles 9a and BT crystal particles 9b composing the crystal particles 9 of the dielectric layers 5 are desirable to coexist at a structural ratio satisfying $A_{BT}/A_{BCT}$=0.1 to 3 in the area ratio of the respective crystal particles 9 in a cross-section or surface crystal structure of the dielectric layers 5 in the case the ratio of BCT crystal particles 9a is defined as $A_{BCT}$ and the ratio of BT crystal particles 9b is defined as $A_{BT}$. Particularly, in terms of further improvement of the relative permittivity, temperature property, and DC bias property, it is more preferably $A_{BT}/A_{BCT}$=0.3 to 2.

It is preferable for both of BCT crystal particles 9a and BT crystal particles 9b to contain Mg, a rare earth element and Mn and the contents of Mg, the rare earth element and Mn in the crystal particles 9 are preferably 0.04 to 0.14 parts by mass for Mg, 0.2 to 0.9 parts by mass for the rare earth element and 0.04 to 0.15 parts by mass for Mn to 100 parts by mass of the crystal particles. Accordingly, the temperature property of the electrostatic capacity can be stabilized and the reliability in a highly accelerated life test can be improved.

Further, in terms of the stabilization of the capacitance temperature characteristics and improvement of the reliability in a highly accelerated life test, it is preferable that the total amount concentration of Mg, the rare earth element and Mn contained in BCT crystal particles 9a is higher than the total amount concentration of Mg, the rare earth element and Mn contained in BT crystal particles 9b. Since these elements, Mg, the rare earth element and Mn, are derived from a sintering aid, they form solid solutions in BCT crystal particles 9a and BT crystal particles 9b, however some exist in grain boundary phases 11 and tend to be amorphous. That is, in the dielectric layers 5, Mg, the rare earth element and Mn are components for making BCT crystal particles 9a and BT crystal particles 9b have the core-shell structure.

On the other hand, Mn compensates the oxygen deficiency in BT crystal particles 9b and BCT crystal particles 9a produced by sintering under reducing atmosphere and can improve the insulation property and the reliability in a highly accelerated life test.

The rare earth element contained in the crystal particles 9 is desirable to have the highest concentration in the grain boundary phases 11 which are the particle surfaces, and concentration gradation from the surfaces of the crystal particles 9 to the particle inside, and the concentration slope is desirably 0.05% by atom/nm or higher. That is, if the rare earth element concentration gradation satisfies the above-mentioned conditions, the relative permittivity and the reliability in a highly accelerated life test can be improved and at the same time X7R standard, as a capacitance temperature characteristics, can be satisfied.

The above-mentioned rare earth element is preferably at least one element selected from La, Ce, Pr, Nd, Sm, Gd, Tb, Dy, Ho, Y, Er, Tm, Yb, Lu, and Sc.

Because of the reason that the relative permittivity of the dielectric layers 5 can be kept high and durability is improved in a highly accelerated life test, alumina impurity contained in the ceramic of the dielectric layers 5 is desirably 1% by mass or lower.

In the case the mean particle size of crystal particles 9 existing in a region of a unit surface area of the dielectric layers 5 is defined as D1 and the mean particle size of Si—Ba—O compound 12 existing in the triple point grain boundaries 11b is defined as D2, it is desirable to satisfy D1>D2. Accordingly, a high dielectric constant can be obtained. The mean particle size is a value measured as follows. After a cross-section of an obtained multilayer ceramic capacitor is polished, the inner structure is photographed by a scanning electron microscope. Next, the profiles of the photographed barium titanate crystal particles 9 are image-processed and the diameters of respective particles are measured and averaged while the particles are assumed to be circular.

Further, the mean particle size of the crystal particles 9 is preferable to be 0.4 μm or smaller and 0.7 μm or smaller on the basis of d90 for accomplishment of high capacity and high insulation property by making the dielectric layers 5 thin. The above-mentioned "d90" is a 90% integrated value on the basis of % in the particle size distribution. On the other hand, the lower limit value of the particle size of BCT crystal particles 9a and BT crystal particles 9b is preferably 0.15 μm or larger for the reason that the relative permittivity of the dielectric layers 5 can be improved and the temperature dependency of the relative permittivity can be suppressed.

The multilayer ceramic capacitor of this embodiment has a high relative permittivity and is superior in the temperature property and highly accelerated life test property, and particularly, as the highly accelerated life test property, the resistance alteration ratio in the grain boundary phases in the dielectric layers is preferably ±0.7%/min or lower before and after the treatment of the highly accelerated life test by an alternating current impedance method (before and after the highly accelerated life test). Next, the alternating current impedance method will be described in detail with reference to drawings.

Figure 3:
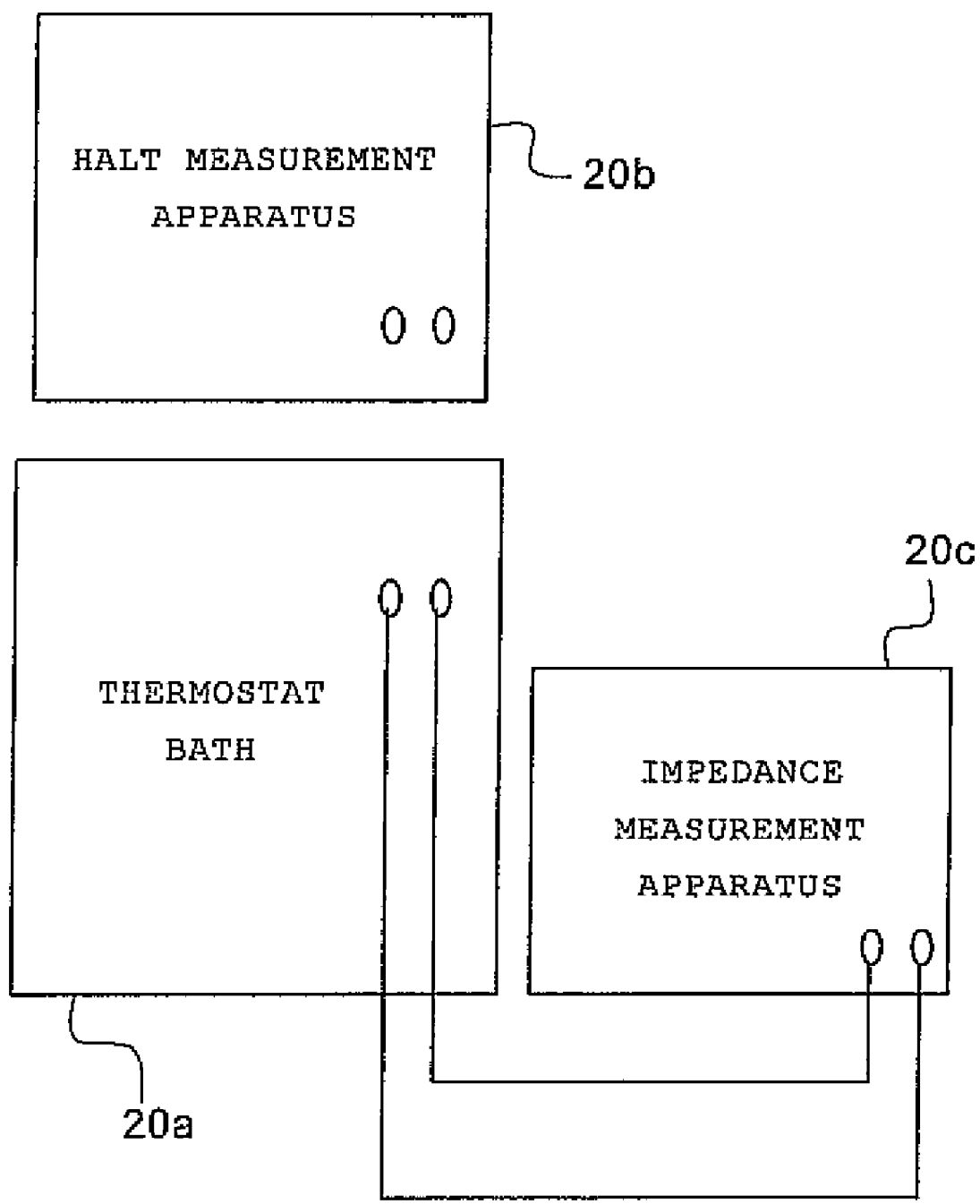
FIG. 3 A schematic illustration showing an evaluation method of grain boundary resistance in a dielectric layer by an alternating current impedance method.
Figure 4:
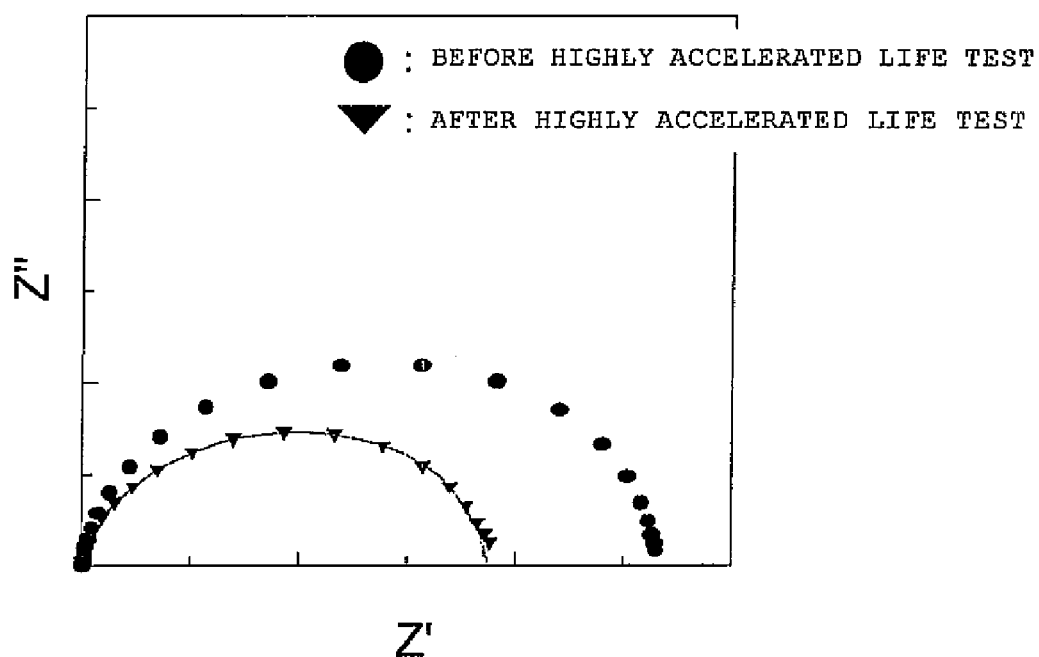
Figure 4:
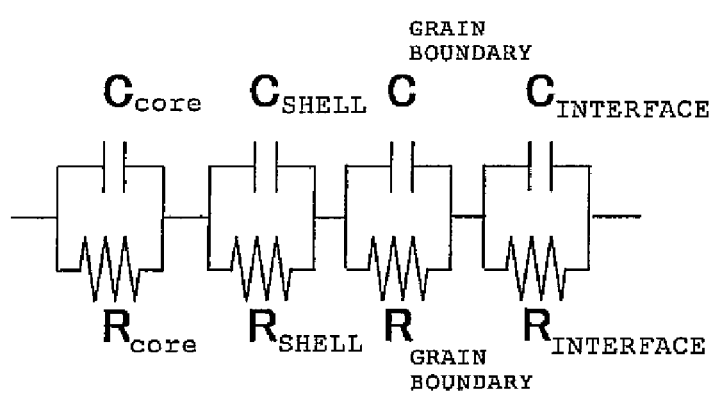

FIG. 3 is a schematic illustration showing an evaluation method of grain boundary resistance in a dielectric layer by an alternating current impedance method. FIG. 4A is a graph showing one example of the evaluation result of the grain boundary resistance in a dielectric layer of one embodiment of the invention by an alternating current impedance method, and FIG. 4B is a schematic illustration showing an equivalent circuit to be used for analysis of the alternating current impedance method.

As shown in FIG. 3, a multilayer ceramic capacitor, which is a sample, is disposed in a thermostat bath 20a controllable to be at a prescribed temperature, and the ambient atmosphere is made to be an atmosphere of high temperature, and the resistance alteration of the grain boundary phases 11 of the dielectric layer 5 before and after the atmosphere of high temperature treatment is measured by an alternating current impedance method in the same conditions using an highly accelerated life test (HALT) measurement apparatus 20b for applying high DC voltage and an impedance measurement apparatus 20c having an AC power source.

Herein, the conditions of the high temperature load atmosphere are a temperature higher than Curie temperature which the perovskite type barium titanate crystal particles composing the dielectric layer 5 shows and a voltage of ⅓ or more of the rated voltage of the multilayer ceramic capacitor. Particularly, since the ion diffusion and electron mobility in the dielectric layer 5 become significant before and after the highly accelerated life test treatment and the resistance alteration in the grain boundary layer 11 can be observed outstandingly, the temperature is preferably 1.5 times as high as the Curie temperature and the voltage is preferably ⅖ V or higher of the rated voltage.

FIG. 4A is a graph showing one example of the evaluation result of the grain boundary resistance in the dielectric layer 5 by the alternating current impedance method. That is, FIG. 4A is a graph (call-call plots) showing impedance alteration in the cores (center parts), shells (outer circumferential parts), grain boundary phases 11, and interfaces of an inner electrode 7 and the dielectric layer 5 in the multilayer ceramic capacitor according to this embodiment.

In this evaluation, the dielectric layer 5 is separated, just like the equivalent circuit shown in FIG. 4B, into four components; the cores (center parts), shells (outer circumferential parts), grain boundary phases 11, and interfaces of an inner electrode 7 and the dielectric layer 5. The abscissa axis of the graph shows real parts of the impedance signals and the ordinate axis shows imaginary parts. The graph showing the impedance alteration is of the difference between before and after the highly accelerated life test (HALT) and of fitting by simulation. Particularly, in this embodiment, the resistance alteration in the grain boundary layers 11 is focused and the alteration ratio in the real parts (the resistance alteration ratio) is desirably ±0.7%/min or lower. The resistance alteration ratio can be measured in the above-mentioned four components by making call-call plots of FIG. 4A before and after the highly accelerated life test (HALT).

<Production Method>

Figure 5:
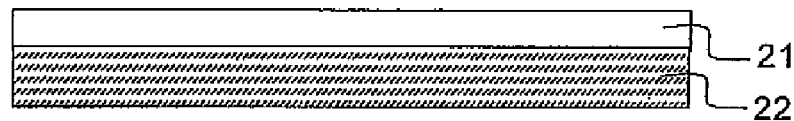
FIG. 5 A process drawing showing a production method of a multilayer ceramic capacitor of one embodiment of the invention.
Figure 5:
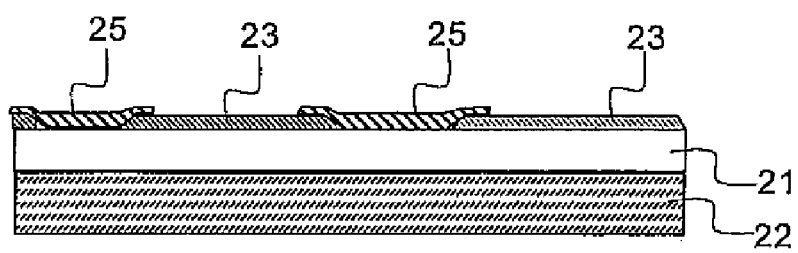
Figure 5:
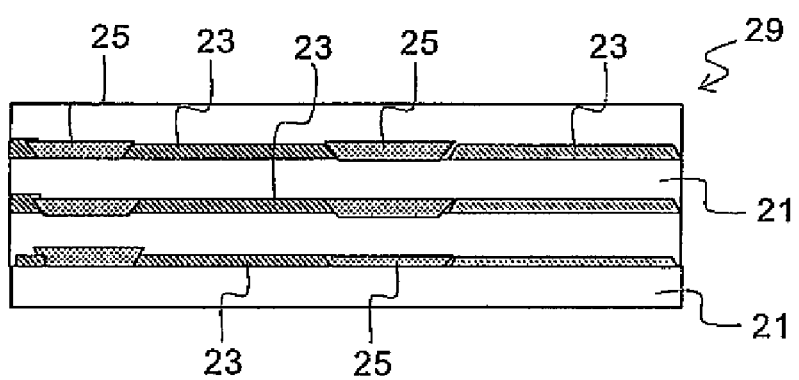
Figure 5:
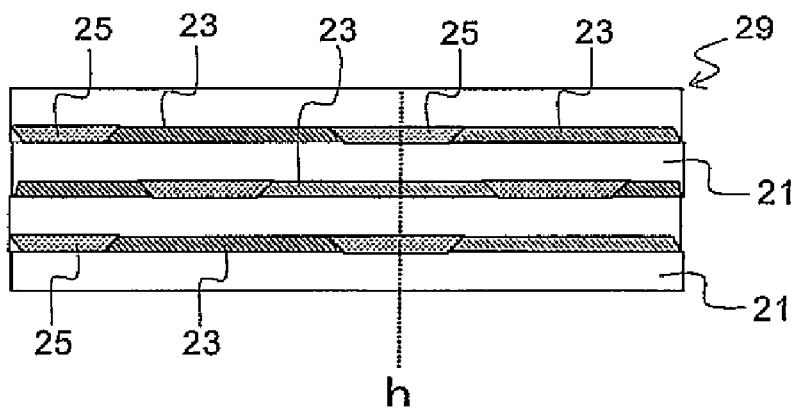

Next, a production method of the multilayer ceramic capacitor according to the above-mentioned embodiment described above-mentioned will be described more in detail with reference to drawings. FIG. 5 shows a process drawing showing a production method of a multilayer ceramic capacitor of one embodiment of the invention.

At first, as shown in FIG. 5A, a ceramic slurry is prepared by mixing the following raw material powders (dielectric powders) with an organic resin such as polyvinyl butyral resin and a solvent such as toluene and alcohol by a ball mill and the ceramic slurry is applied to a substrate 22 by a sheet formation method using a doctor blade method or a die coater method for forming a ceramic green sheet 21. The thickness of the ceramic green sheet 21 is preferably 1 to 4 μm in terms of thin thickness for high capacity of a dielectric layer 5 and high insulation property retention.

The above-mentioned dielectric powders are preferably of the perovskite type barium titanate powder (BCT powder) in which a portion of A site is replaced with Ca and the perovskite type barium titanate powder (BT powder) containing no substituent Ca and these dielectric powders are preferably raw material powders defined as $(Ba_{1-x}C_x)TiO_3$ and $BaTiO_3$, respectively.

The substitution amount of Ca in the A site of the above-mentioned BCT powder is preferable to be x=0.01 to 0.2 and particularly preferable to be x=0.03 to 0.1. Further, with respect to the BCT powder, the mole ratio A/B of the constituent components A site (barium) and B site (titanium) is desirably 1.003 or higher. Accordingly, the grain growth of the dielectric powder can be suppressed at the time of sintering. These BT powder and the BCT powder are synthesized by mixing compounds containing a Ba component, a Ca component, and a Ti component in proper amounts to give a prescribed composition. These dielectric powders are obtained by a synthetic method selected from a solid-phase method, a liquid-phase method (including a production method using oxalic acid salts), and a hydrothermal synthesis method. Among these methods is the hydrothermal synthesis method preferable to obtain the dielectric powders since the obtained dielectric powders have narrow particle diameter distribution and good crystallinity.

The particle diameter distribution of the barium titanate powder (BT powder) and the barium calcium titanate powder (BCT powder), which are the dielectric powders of this embodiment is desirably 0.15 to 0.4 μm in terms of the easiness of making the dielectric layers 5 thin and the increase of the relative permittivity of the dielectric powders.

Further, as the dielectric powders with such high relative permittivity are desirably those which have 1.1 or higher ratio $P_{AA}/P_{BB}$ of the peak of an index (001) $P_{AA}$ showing the tetragonal system and the peak of an index (100) $P_{BB}$ showing the cubic system.

In the case of composing the dielectric layers 5 of the embodiment, in terms of further improvement of particularly relative permittivity, temperature property, and DC bias property in form of a ceramic obtained by sintering, the mixing ratio of the above-mentioned BCT powder and BT powder is desirable to satisfy ($W_{BCT}/W_{BT}$) in a range from 0.95 to 1.05 wherein $W_{BCT}$ denotes the BCT powder amount and $W_{BT}$ denotes the BT powder amount.

Mg to be added to the above-mentioned dielectric powders is preferably in an amount of 0.04 to 0.14 parts by mass on the basis of an oxide to 100 parts by mass of the dielectric powders, a mixture of the BCT powder and BT powder; the rare earth metal is preferably in an amount of 0.2 to 0.9 parts by mass on the basis of an oxide to 100 parts by mass of the dielectric powders, a mixture of the BCT powder and BT powder; and Mn is preferably in an amount of 0.04 to 0.15 parts by mass on the basis of an oxide to 100 parts by mass of the dielectric powders, a mixture of the BCT powder and BT powder.

The glass powder to be added to the above-mentioned dielectric powders is preferable to be composed of $Li_2O$, $SiO_2$, BaO, and CaO as constituent components. The addition amount of the glass powder is 0.7 to 2 parts by mass, preferably 1 to 1.4 parts by mass, to 100 parts by mass of the dielectric powders, a mixture of the BCT powder and BT powder in terms of the improvement of the sintering property of a ceramic. The composition is preferably $Li_2O$=5 to 15% by mole, $SiO_2$=40 to 60% by mole, BaO=10 to 30% by mole, and CaO=10 to 30% by mole.

For the glass powder in this embodiment, it is important the content of alumina is 0.1% by mass or less and particularly preferably it is 0.08% by mass or less. Further, the addition amount of a barium carbonate is 0.01 to 1 parts by mass to 100 parts by mass of the dielectric powders, a mixture of the BCT powder and BT powder. Accordingly, the grain growth can be suppressed.

For the dielectric layers 5 in this embodiment, as described, it is important that Si—Ba—O compound 12 is formed in the triple point grain boundaries 11b and the ratio of triple point grain boundaries 11b existing in the Si—Ba—O compound 12 is 5% or higher in the total number of the triple point grain boundaries per unit surface area of the dielectric layers 5.

Herein, the specific surface area of barium carbonate ($BaCO_3$) is preferably 10 to 20 $m^2/g$ and particularly preferably 12 to 14 $m^2/g$. If it is within the range, it brings an advantageous point that the Si—Ba—O compound 12 is formed easily. If the specific surface area of barium carbonate is narrower than 10 $m^2/g$ (the powder particle size is large), the resistance of the grain boundary phases becomes low and the high temperature load life is shortened. The reason for that is because large Ba—Si—O compound is formed in the grain boundaries. Further, in the case the specific surface area of barium carbonate is wider than 20 $m^2/g$ (the powder particle size is small), agglomeration occurs and the compound unevenly deposited in some grain boundaries and the resistance of the grain boundary phases tends to be lowered and thus the high temperature load life is shortened.

For such dielectric layers 5, the glass composition to be added is preferably Si: 40 to 60, Ba: 10 to 30, Ca: 10 to 30, and Li: 5 to 15 on the basis of mole ratio and the content of alumina in the glass is preferably 0.1% by mass or lower and particularly preferably 0.08% by mass or lower and the barium component is added separately from the barium component in the barium titanate and the dielectric layers 5 can be formed in the case existence of free barium component is satisfied.

That is, generally, in the case the alumina amount is high in the glass to be added, the Si component, which is the main component of glass, is reacted with alumina. The produced Si—Al—O compound tends to be glassy and then exists in a state that the compound is dispersed evenly in the interfacial grain boundaries and triple point grain boundaries and moreover, particular crystal phases are difficult to be formed. On the other hand, if the glass has the configuration as described in this embodiment, production of the compound of the Si component, which is the main component of the glass, and alumina is suppressed and instead, the Si—Ba—O compound tends to be formed. Furthermore, since the Si—Ba—O compound is easy to be crystallized, the compound hardly exists in the narrow interfacial grain boundaries between neighboring crystal particles 9. As a result, the glass component and the additive component to be added together with the dielectric materials can be made to exist together locally in the triple point grain boundaries 11b in the dielectric layers and thus excess glass component existing in the interfacial grain boundaries 11a can be suppressed and the characteristic property of the crystal particles 9 as a ferroelectric material can be improved and the insulation property of the grain boundaries 11 can be improved.

Next, as shown in FIG. 5B, a rectangular inner electrode pattern 23 is formed by printing on the main face of the above-mentioned ceramic green sheet 21. The conductive paste to form the inner electrode pattern 23 contains Ni, Cu, or their alloy powder as a main component metal and is prepared by adding a ceramic powder as a coexisting ingredient and further adding an organic binder, a solvent, and a dispersant. The metal powder is preferably Ni since simultaneous sintering with the above-mentioned dielectric powders is made possible and the cost is low. The ceramic powder may be either a BT powder with a low Ca concentration or a BCT powder with a high Ca concentration, however BT powder is preferable since the grain growth of the ceramic powder in the inner electrode can be suppressed and the temperature dependency of the capacity of the multilayer ceramic capacitor can be lowered.

On the other hand, the BCT powder is preferable in terms of that the bonding strength to the dielectric layers can be increased and the inner stress of the multilayer ceramic capacitor is increased to prevent separation between the dielectric layers 5 and the inner electrode layers 7.

The thickness of the inner electrode pattern 23 is preferably 1 μm or thinner for a reason that to be a miniaturization of the multilayer ceramic capacitor and that the step due to inner electrode pattern 23 is decreased.

In this connection, in this embodiment, to solve the step due to the inner electrode pattern 23 on the ceramic green sheet 21, it is preferable to form a ceramic pattern 25 with the substantially same thickness as that of the inner electrode pattern 23 in the surrounding of the inner electrode pattern 23. The ceramic components composing the ceramic pattern 25 are preferably the above-mentioned dielectric powders in terms of that the sintering shrinkage is made same by simultaneous sintering.

Next, as shown in FIGS. 5C-1 and 5C-2, a prescribed number of ceramic green sheets 21 each bearing the inner electrode pattern 23 are multilayer and a plurality of ceramic green sheets 21 having no inner electrode pattern 23 are layered on the top and the bottom sides in a manner that the same number of sheets are multilayer in the upper and lower layers to give a temporary laminate body. The inner electrode patterns 23 in the temporary laminate body are shifted from one another by a half pattern in the longitudinal direction. Due to such a lamination manner, the inner electrode patterns 23 are exposed alternately in the end faces of the laminate body after cutting.

In this embodiment, as described above, besides the method of laminating the ceramic green sheets 21 after the inner electrode pattern 23 is formed previously on the main face of each sheet, the following method may be employed for the formation, that is, after a ceramic green sheet 21 is at first closely attached to a substrate in the lower layer side; the inner electrode pattern 23 is printed thereon and dried; successively another ceramic green sheet 21 having no inner electrode pattern 23 printed is multilayer and temporarily layered on the printed and dried inner electrode pattern 23, and in such a manner, close lamination of the ceramic green sheets 21 and printing of the inner electrode patterns 23 are alternately repeated.

Next, the temporary laminate body is pressed under conditions of higher temperature and higher pressure than the temperature and pressure at the time of the above-mentioned temporary lamination to form a laminate body 29 in which the ceramic green sheets 21 and the inner electrode patterns 23 are firmly bonded. The laminate body 29 is cut along the cutting line h, that is, the approximately center part of the ceramic pattern 29 formed in the laminate body is cut in vertical direction relatively to the longitudinal direction of the inner electrode patterns 23 (FIG. 5C-1) and in parallel to the longitudinal direction of the inner electrode patterns 23 (FIG. 5C-2) to form a green body of the capacitor body in a manner that the end parts of the inner electrode patterns 23 are exposed.

On the other hand, with respect to the widest portions of the inner electrode patterns 23, the inner electrode patterns 23 are formed in a state that they are not exposed in the side margin parts.

Next, the green body of the capacitor body is sintered in prescribed atmosphere and temperature conditions to form a capacitor body 1. In some cases, the edge line parts of the capacitor body may be chamfered and at the same time, to expose the inner electrode layers exposed to the mutually opposed end faces of the capacitor body, barrel polishing may be carried out. In the production method of this embodiment, it is preferable to carry out in the following conditions: the degreasing in a temperature range to 500° C., temperature increase speed of 5 to 20° C./hour, the highest sintering temperature in a range of 1130 to 1230° C., the temperature increase speed from the degreasing to the highest temperature in a range of 200 to 500° C./hour, the retention time at the highest temperature in a range from 0.5 to 4 hours, the temperature decrease speed from the highest temperature to 1000° C. in a range from 200 to 500° C./hour, the ambient atmosphere of hydrogen-nitrogen, the highest temperature of the heat treatment after sintering (re-oxidation treatment) in a range from 900 to 1100° C., and the ambient atmosphere of nitrogen.

Next, an outer electrode paste is applied to the mutually opposed end parts of the capacitor body 1 and baked to form the outer electrodes 3 and thus the multilayer ceramic capacitor of this embodiment can be obtained. In addition, the surfaces of the outer electrodes 3 may be plated to improve the installation property.

Next, another production method of the multilayer ceramic capacitor according to another embodiment of the invention will be described. In this embodiment, the dielectric powders to be used differ from the dielectric powders used in the above described embodiment. Practically, different from the method of adding oxide powders of Mg, a rare earth element and Mn to the above-mentioned BCT-powder and BT powder, dielectric powders obtained by previously coating the BCT powder and BT powder with oxide powders of Mg, a rare earth element and Mn may also be used. In this case, the steps of FIGS. 5A to 5C are same other than the dielectric powders are different.

That is, with respect to a multilayer ceramic capacitor production method involving sintering a green body of a capacitor body composed by alternately laminating ceramic green sheets containing dielectric powders and an organic resin and inner electrode patterns, the production method of this embodiment uses a powder obtained by adding 1 to 1.4 parts by mass of glass having an alumina content of 0.1% by mass or lower and 0.01 to 1 parts by mass of barium carbonate to 100 parts by mass of a powder mixture of a perovskite type barium titanate powder (BCT powder) in which a portion of A site is replaced with Ca and a perovskite type barium titanate powder (PT powder) containing no substituent Ca both are coated with oxides of Mg, a rare earth element and Mn.

In the above-mentioned case, as compared with the case of adding the oxides of Mg, a rare earth element and Mn, the amounts of the oxides of Mg, a rare earth element and Mn, particularly the amounts of Mg and the rare earth element can be saved. Therefore, decrease of the relative permittivity of the BT powder and the BCT powder can be suppressed and the more fine powders as the BT powder and the BCT powder can be used.

To coat the BT powder and the BCT powder with the oxides of Mg, a rare earth element and Mn, a method involving mixing prescribed amounts of the oxides of Mg, a rare earth element and Mn with the BT powder and the BCT powder and coating the BT powder and the BCT powder with the oxides by, for example, a mechanochemical method.

In this embodiment, since the BT powder and the BCT powder can be separately coated with Mg, a rare earth element and Mn, the coating amounts can be changed and the total concentration of Mg, the rare earth element and Mn contained in the BCT powder is desirably higher than the total concentration of Mg, the rare earth element and Mn contained in the BT powder. Accordingly, the grain growth of the BCT powder which tends to easily cause grain growth at the time of sintering can be efficiently suppressed and diffusion of Ca from the BCT powder can be suppressed.

The BCT crystal particles 9a and the BT crystal particles 9b described above-mentioned generally tend to cause grain growth due to the atom diffusion at the time of sintering and thus make it difficult to obtain a dense sintered body with a very small particle size. Particularly, in the case the used raw material particle size is smaller than sub-micron level, the surface area is increased relatively to the particle volume and due to the high surface energy, the particles are in unstable state in terms of the energy. Therefore, at the time of sintering, grain growth is caused due to the atom diffusion and the surface area is narrowed and the surface energy is lowered to stabilize the particle existence state. Accordingly, the grain growth tends to be caused easily and it becomes difficult to obtain a dense sintered body containing particles of a very small size.

Practically, in a sintered body of BT crystal particles 9b and BCT crystal particles 9a with a very small particle size smaller than 0.2 μm, solid solution is easily formed and grain growth easily occurs and therefore, unless those which suppress transfer of atoms among particles are introduced into voids among the particles, a sintered body containing particles with a particle size exceeding 1 μm is formed and thus it becomes difficult to obtain a dense sintered body containing particles of a very small size.

In this invention, a very fine crystal raw material is used and at the same time the mole ratio A/B of the A site (barium) and the B site (titanium) in barium calcium titanate crystal particles is adjusted to be 1.003 or higher and Mg and a rare earth element such as Y are introduced as additives and further the sintering conditions are adjusted, to that a sintered body containing very small particles corresponding to the raw material crystal particles can be obtained. If the element ratio is made high in the A site side in the barium titanate or barium calcium titanate, a large quantity of barium or barium-calcium exists on the particle surfaces and accordingly, barium and other additives are diffused on the particle surfaces and form liquid phases to promote sintering and at the same time barium and other additives exist in grain boundary peripheries and grain boundaries to suppress transfer of Ba, Ca and Ti atoms among BT and BCT crystal particles which form mother phases and suppress the grain growth.

As the above-mentioned results, crystal phases in which besides barium, Mg and the rare earth element are diffused and form solid solution are formed on the crystal particle surfaces. That is, a core-shell structure in which Mg and the rare earth element exist unevenly on the particle surfaces is formed. In addition, formation of such a core-shell structure can be confirmed by observing these crystal particles by a transmission electron microscope.

As described, in the production method of the multilayer ceramic capacitor of the invention, the Si—Ba—O compound can be formed in the triple point regions of the dielectric ceramic, which is a sintered body, by adding the glass powder with an aluminum content of 0.1% by mass or lower and barium carbonate to the dielectric powders and accordingly, the relative permittivity of the dielectric ceramic and the temperature property of the electrostatic capacity and the reliability of the highly accelerated life test can be improved.

Hereinafter, the invention will be described more in detail with reference to Examples, however it is not intended that the invention be limited to the illustrated Examples.

Example 1

<Production of Multilayer Ceramic Capacitor>

A multilayer ceramic capacitor was produced as follows. Herein, BT powder and BCT powder with 1.003 A/B site ratio of BT powder and BCT powder were employed. The particle size of the BT and BCT powders employed was 0.2 to 0.4 μm. The BT powder and the BCT powder employed here were respectively coated with Mg, Y and Mn. The coating amounts were MgO=0.022 parts by mass, $Y_2O_3$=0.122 parts by mass and MnO=0.023 parts by mass to 100 parts by mass of the BT powder, and MgO=0.065 parts by mass, $Y_2O_3$=0.37 parts by mass and MnO=0.069 parts by mass to 100 parts by mass of the BCT powder.

The glass powder had a composition of $SiO_2$=50, BaO=20, CaO=20 and $Li_2O$=10 (% by mole) and a mean particle size of 0.5 μm, and the addition amount of the glass powder was 1.2 parts by mass to 100 parts by mass of the dielectric powders. In this case, the alumina content in the glass powder employed here was as shown in Table 1. The amount of added barium carbonate was also as shown in Table 1. The barium carbonate powder employed here has a specific surface area of 12 $m^2$/g.

The above-mentioned powders were wet-mixed with a solvent mixture of toluene and alcohol as a solvent using zirconia balls with a diameter of 5 mm. Next, a polyvinyl butyral resin and a solvent mixture of toluene and alcohol were added to the wet-mixed powder and mixed in wet state by similarly using zirconia balls with a diameter of 5 mm to prepare a ceramic slurry. A ceramic green sheet with a thickness of 3 μm was produced by a doctor blade method.

Next, a plurality of rectangular inner electrode patterns containing Ni as a main component was formed on the upper face of the ceramic green sheet. The conductor paste used for the inner electrode patterns was produced by adding the BT powder used for the green sheet as a co-existence material in an amount shown in Table 1 to the 100 parts by mass of a Ni powder with a mean particle size of 0.3 μm.

Next, 360 ceramic green sheets each having the printed inner electrode patterns were multilayer, each 20 ceramic green sheets having no inner electrode pattern were multilayer on the top and down faces of the obtained laminate body and the resulting laminate body was collectively multilayer at a temperature of 60° C. and pressure of $10^7$ Pa for 10 minutes and cut in a prescribed size.

Next, the multilayer and green body was subjected to debinder treatment at a temperature increase speed of 10° C./hour and at 300° C./hour in atmosphere; sintered at a temperature increase speed of 300° C./hour from 500° C. and a temperature of 1150 to 1200° C. for 2 hours in hydrogen-nitrogen atmosphere; successively cooled at a temperature decrease speed of 300° C./hour to 1000° C.; again oxidized at 1000° C. for 4 hours in nitrogen atmosphere; and cooled at a temperature decrease speed of 300° C./hour to produce a capacitor body. The size of the capacitor body was 2×1.3×1.3 $mm^3$ and the thickness of the dielectric layers was 2 μm.

Next, after the sintered electronic part body was barrel polished, an outer electrode paste containing a Cu powder and glass was applied to both end parts of the electronic part body and baked at 850° C. to form outer electrodes. After that, an electrolytic barrel apparatus was used for successively carrying out Ni plating and Sn plating on the surfaces of the outer electrodes to produce a multilayer ceramic capacitor (samples No. 1 to 5 in Table 1).

A BCT powder with the A/B site ratio of 1 was used as the raw material powder for the sample No. 5.

The dielectric layers composing each multilayer ceramic capacitor (samples No. 1 to 5 in Table 1) produced in the above-mentioned manner were found having $A_{BT}/A_{BCT}$=0.8 to 1.2 on the basis of the surface area ratio of crystal particles in the cross-sectional crystal structure in the case the ratio of BCT crystal particles was defined as $A_{BCT}$ and the ratio of BT crystal particles was defined as $A_{BT}$. Further, the rare earth element (yttrium) contained in barium titanate crystal particles had a concentration gradation from the highest concentration in the grain boundary layers, which are the particle surfaces, of 0.05% by atom/nm or higher from the crystal particle surfaces to the particle inside.

As Comparative Example, the glass powder with an alumina component amount higher than the defined amount in the invention and the BT and BCT powders containing no barium carbonate to were prepared in the same manner as described above (samples No. 6 and 7 in Table 1).

Successively, the $A_{BT}/A_{BCT}$ ratios of the obtained multilayer ceramic capacitors were measured in the same manner for the above-mentioned samples No. 1 to 5 to find the ratios, and were 0.8. The concentration gradation was 0.05% by atom/nm.

<Evaluation>

Next, for these multilayer ceramic capacitors (samples No. 1 to 7 in Table 1), the following evaluations were carried out.

The electrostatic capacity, the relative permittivity, and the temperature characteristics of the relative permittivity were measured under measurement conditions of 1.0 kHz frequency and 0.5 Vrms of measured voltage. The relative permittivity was calculated from the electrostatic capacity, the efficacious surface area of the inner electrode layers, and the thickness of the dielectric layers. The temperature range of the temperature property was from −55 to 125° C.

The dielectric breakdown voltage (BDV) was defined as the voltage at the time each sample caused dielectric breakdown in the case the DC voltage was increased.

Whether X7R standard (the capacitance temperature characteristics in a temperature range from −55 to 125° C. is within ±15%) was satisfied or not was judged.

The highly accelerated life test was carried out at the temperature of 125° C. and 9.45V for 1000 hours to carry out evaluation (MTTF). 30 specimens of ach sample were employed. Separate measurement was carried out by the above described AC impedance method. In this case, the high temperature load conditions were temperature of 250° C. and 3V applied to the outside electrodes of the multilayer ceramic capacitors. The voltage at the time of measurement was 0.1 V and the frequency was 10 mHz to 10 kHz and the a.c. impedance before and after the treatment was measured for 30 specimens of each sample.

The mean particle sizes of the BT type crystal particles and the BCT type crystal particles composing the dielectric layers were measured by a scanning electron microscope (SEM). The polishing faces were etched and 20 crystal particles were arbitrarily selected in each electron microscopic photograph and the maximum diameters of the respective crystal particles were measured by intercept method, and the average value of them and D90 (90% integrated value from the smaller size side to the larger size side) were measured.

To evaluate the grain boundary phases, arbitrary sites were analyzed using a transmission electron microscope and EDS. Practically, existence of the Si—Ba—O compound in the triple point grain boundaries was determined when the existence of crystal phases in a magnified level of the transmission electron microscope was confirmed. The element analysis in the interfacial grain boundaries was carried out at 5 nm intervals in the perpendicular direction and the existence of the element is limited at the limited concentration corresponding to the detection limit of EDS.

These results are shown altogether in Table 1.

TABLE 1

| Sample No.[1] | Alumina content in the glass powder (% by mass) | Amount of $BaCO_3$ (parts by mass) | Sintering temperature (° C.) | Crystal particles after sintering (BT, BCT) Mean particle size (μm) | Crystal particles after sintering (BT, BCT) Particle size (D90) | A/B site ratio[2] | Existence of Si—Ba—O compound in triple point grain boundary | Ratio of the triple point grain boundary where the Si—Ba—O compound exist (%) | $C_2/C_1$ ratio[3] |
|---|---|---|---|---|---|---|---|---|---|
| 1 | 0.06 | 0.43 | 1155 | 0.25 | 0.42 | 1.005 | Existence | 18 | 2.4 |
|   |   |   | 1170 | 0.25 | 0.42 |   |   |   |   |
|   |   |   | 1185 | 0.26 | 0.44 |   |   |   |   |
|   |   |   | 1200 | 0.26 | 0.44 |   |   |   |   |
| 2 | 0.08 | 0.43 | 1155 | 0.25 | 0.42 | 1.005 | Existence | 30 | 2.3 |
|   |   |   | 1170 | 0.25 | 0.42 |   |   |   |   |
|   |   |   | 1185 | 0.26 | 0.44 |   |   |   |   |
|   |   |   | 1200 | 0.26 | 0.44 |   |   |   |   |
| 3 | 0.08 | 0.2 | 1155 | 0.27 | 0.44 | 1.004 | Existence | 15 | 1.4 |
|   |   |   | 1170 | 0.27 | 0.44 |   |   |   |   |
|   |   |   | 1185 | 0.28 | 0.46 |   |   |   |   |
|   |   |   | 1200 | 0.28 | 0.46 |   |   |   |   |
| 4 | 0.1 | 0.43 | 1155 | 0.25 | 0.42 | 1.005 | Existence | 10 | 1.2 |
|   |   |   | 1170 | 0.25 | 0.42 |   |   |   |   |
|   |   |   | 1185 | 0.26 | 0.44 |   |   |   |   |
|   |   |   | 1200 | 0.27 | 0.45 |   |   |   |   |
| 5 | 0.08 | 0.43 | 1155 | 0.25 | 0.45 | 1.004 | Existence | 25 | 1.9 |
|   |   |   | 1170 | 0.25 | 0.45 |   |   |   |   |
|   |   |   | 1185 | 0.26 | 0.47 |   |   |   |   |
|   |   |   | 1200 | 0.26 | 0.47 |   |   |   |   |
| *6 | 0.15 | 0.43 | 1155 | 0.25 | 0.42 | 1.005 | No existence | 3 | 1.1 |
|   |   |   | 1170 | 0.25 | 0.42 |   |   |   |   |
|   |   |   | 1185 | 0.26 | 0.44 |   |   |   |   |
|   |   |   | 1200 | 0.26 | 0.44 |   |   |   |   |
| *7 | 0.08 | 0 | 1155 | 0.25 | 0.42 | 1.003 | No existence | 0 | 1.2 |
|   |   |   | 1170 | 0.25 | 0.42 |   |   |   |   |
|   |   |   | 1185 | 0.26 | 0.44 |   |   |   |   |
|   |   |   | 1200 | 0.26 | 0.44 |   |   |   |   |

| Sample No.[1] | Electrostatic capacity (μF) | Relative permittivity | Temperature fluctuation ratio of the electrostatic capacity at 125° C. (%) | X7R standard is satisfy or not | BDV (V) | MTTF[4] occurrence of defect | Resistance variation ratio before and after treatment of highly accelerated life test[5] (%/min.) |
|---|---|---|---|---|---|---|---|
| 1 | 9.4 | 3500 | −13.9 | ○ | 165 | No defect | −0.3 |
|   | 9.4 | 3500 | −13.7 | ○ | 157 | No defect | −0.3 |
|   | 9.3 | 3550 | −13.7 | ○ | 157 | No defect | −0.4 |

TABLE 1-continued

| Sample | | | | | | | |
|---|---|---|---|---|---|---|---|
| | 9.3 | 3600 | −13.6 | ○ | 158 | No defect | −0.4 |
| 2 | 9.4 | 3500 | −13.9 | ○ | 165 | No defect | −0.3 |
| | 9.4 | 3500 | −13.7 | ○ | 157 | No defect | −0.3 |
| | 9.3 | 3550 | −13.7 | ○ | 157 | No defect | −0.4 |
| | 9.3 | 3600 | −13.6 | ○ | 158 | No defect | −0.4 |
| 3 | 9.4 | 3540 | −14 | ○ | 161 | No defect | −0.4 |
| | 9.4 | 3550 | −13.8 | ○ | 155 | No defect | −0.4 |
| | 9.3 | 3560 | −13.8 | ○ | 154 | No defect | −0.5 |
| | 9.3 | 3620 | −13.7 | ○ | 155 | Ne defect | −0.5 |
| 4 | 9 | 3200 | −13.9 | ○ | 165 | No defect | −0.4 |
| | 9 | 3200 | −13.8 | ○ | 157 | No defect | −0.4 |
| | 8.9 | 3300 | −13.9 | ○ | 158 | No defect | −0.5 |
| | 8.9 | 3300 | −14.1 | ○ | 156 | No defect | −0.6 |
| 5 | 9.5 | 3550 | −14.2 | ○ | 163 | No defect | −0.4 |
| | 9.5 | 3550 | −14.3 | ○ | 155 | No defect | −0.4 |
| | 9.4 | 3580 | −14.4 | ○ | 155 | No defect | −0.5 |
| | 9.4 | 3620 | −15 | ○ | 154 | No defect | −0.5 |
| *6 | 8.8 | 3100 | −14.5 | ○ | 166 | No defect | −0.5 |
| | 8.8 | 3100 | −14.6 | ○ | 158 | No defect | −0.6 |
| | 8.7 | 3150 | −14.7 | ○ | 159 | Defect | −1.01 |
| | 8.7 | 3150 | −14.7 | ○ | 157 | Defect | −1.01 |
| *7 | 9.8 | 3650 | −16.5 | X | 128 | Defect | −1.08 |
| | 9.7 | 3650 | −16.2 | X | 126 | Defect | −1.07 |
| | 9.6 | 3700 | −15.6 | X | 120 | Defect | −1.06 |
| | 9.5 | 3700 | −15.6 | X | 115 | Defect | −1.07 |

[1] Samples marked '*' are out of the scope of the present invention.
[2] A: Ba, Ca, B: Ti
[3] C2/C1 ratio of the Si concentration C1 in the interfacial grain boundary and the Si concentration C2 in the triple point grain boundary.
[4] MTTF: 125° C., 9.45 V, 1000 hours
[5] Resistance evaluation of grain boundary phase by an alternating current impedance method.

As being made clear from Table 1, in the case of the samples No. 1 to 5 for which glass powders with an aluminum content of 0.1% by mass or lower was used and prescribed amounts of a barium carbonate powder was added together with a dielectric powder, in which the Si—Ba—O compound was formed in the triple point grain boundaries in the dielectric layers, and which had 5% or higher ratio of the triple point grain boundaries where the Si—Ba—O compound existed in the entire triple point grain boundaries per unit surface area of the dielectric layers, the relative permittivity was 3200 or higher in the entire temperature range of the sintering temperature of 1150 to 1200° C., the temperature property was in a range of −15% at 125° C., the dielectric breakdown voltage (BDV) was 154V or higher, no defect was caused in the highly accelerated life test (125° C., 9.45 V, 1000 hours), and the resistance variation ratio was −0.6%/min. or lower by the AC impedance method.

Particularly, in the case of the samples No. 1 to 3 and 5, for which 0.2 to 0.43% by mass of the barium carbonate powder with a specific surface area of 12 m²/g was used, the resistance variation ratio was within −0.5%/min. before and after the treatment of the highly accelerated life test in a sintering temperature of 1155 to 1200° C.

On the other hand, in the case of the sample No. 6 for which the glass powder with an alumina content of 0.15% by mass was used, the grain boundary ratio of the triple point grain boundaries where the Si—Ba—O compound was confirmed to exist in the dielectric layers was 3% and the relative permittivity was lowered and in the case of sintering at 1150° C. and 1170° C., although the temperature property of the electrostatic capacity and the reliability of the highly accelerated life test were satisfactory, in the case of sintering at 1185° C. and 1200° C., the capacitance temperature characteristics the reliability of the highly accelerated life test were unsatisfactory.

Further, in the case of the sample No. 7 for which no barium carbonate powder was added and no Si—Ba—O compound existence was confirmed in the dielectric layers, the temperature property of the electrostatic capacity was high and the resistance variation ratio measured by the AC impedance method was considerably high and thus the highly accelerated life test was unsatisfactory for all of the samples sintered in a temperature range of 1150 to 1200° C.

Example 2

Multilayer ceramic capacitors (samples No. 8 to 12 in Table 2) were produced in the same manner as the above-mentioned Example 1, except that barium carbonate with the specific surface area shown in Table 2 was used. The results of $A_{BT}/A_{BCT}$ measurement carried out in the same manner as Example 1 for the obtained multilayer ceramic capacitors were in a range of 0.8 to 1.2. The concentration gradation was 0.05% by atom/nm or higher.

Next, for these multilayer ceramic capacitors (samples No. 8 to 12 in Table 2), the electrostatic capacity, the relative permittivity, the temperature property of the relative permittivity, the dielectric breakdown voltage, X7R standard, highly accelerated life test (MTTF impedance method), the mean particle size (average value and D90) of the BT type crystal particles and BCT type crystal particles composing the dielectric layers, the evaluation of grain boundary phases (existence of Si—Ba—O compound in triple point grain boundaries 11b and element analysis of the interfacial grain boundaries) were evaluated in the same manner as the above-mentioned Example 1. The results of these measurements are shown together in Table 2.

TABLE 2

| Sample No.[1] | Alumina content in the glass powder (% by mass) | BaCO₃ Specific surface area (m²/g) | BaCO₃ Addition amount (parts by mass) | Sintering temperature (°C.) | Crystal particles after sintering (BT, BCT) Mean particle size (μm) | Crystal particles after sintering (BT, BCT) Particle size (D90) | A/B site ratio[2] | Existence of Si—Ba—O compound in triple point grain boundary | Ratio of the triple point grain boundary where the Si—Ba—O compound exist (%) |
|---|---|---|---|---|---|---|---|---|---|
| 8 | 0.08 | 12 | 0.5 | 1155 | 0.24 | 0.46 | 1.005 | Existence | 35 |
|   |   |   |   | 1170 | 0.24 | 0.46 |   |   |   |
|   |   |   |   | 1185 | 0.25 | 0.47 |   |   |   |
|   |   |   |   | 1200 | 0.27 | 0.47 |   |   |   |
| 9 | 0.08 | 12 | 0.6 | 1155 | 0.23 | 0.46 | 1.005 | Existence | 40 |
|   |   |   |   | 1170 | 0.23 | 0.46 |   |   |   |
|   |   |   |   | 1185 | 0.24 | 0.47 |   |   |   |
|   |   |   |   | 1200 | 0.26 | 0.47 |   |   |   |
| 10 | 0.08 | 9 | 0.43 | 1155 | 0.26 | 0.46 | 1.005 | Existence | 25 |
|   |   |   |   | 1170 | 0.26 | 0.46 |   |   |   |
|   |   |   |   | 1185 | 0.27 | 0.47 |   |   |   |
|   |   |   |   | 1200 | 0.28 | 0.47 |   |   |   |
| 11 | 0.08 | 14 | 0.43 | 1155 | 0.25 | 0.42 | 1.005 | Existence | 28 |
|   |   |   |   | 1170 | 0.25 | 0.42 |   |   |   |
|   |   |   |   | 1185 | 0.26 | 0.44 |   |   |   |
|   |   |   |   | 1200 | 0.26 | 0.44 |   |   |   |
| 12 | 0.08 | 20 | 0.43 | 1155 | 0.24 | 0.41 | 1.005 | Existence | 26 |
|   |   |   |   | 1170 | 0.24 | 0.41 |   |   |   |
|   |   |   |   | 1185 | 0.25 | 0.43 |   |   |   |
|   |   |   |   | 1200 | 0.26 | 0.43 |   |   |   |

| Sample No.[1] | C₂/C₁ ratio[3] | Electrostatic capacity (μF) | Relative permittivity | Temperature fluctuation ratio of the electrostatic capacity at 125° C. (%) | X7R standard is satisfy or not | BDV (V) | MTTF[4] occurrence of defect | Resistance variation ratio before and after treatment of highly accelerated life test[5] (%/min.) |
|---|---|---|---|---|---|---|---|---|
| 8 | 2.4 | 9.3 | 3460 | −13.1 | ○ | 164 | No defect | −0.3 |
|   |   | 9.3 | 3470 | −12.9 | ○ | 155 | No defeat | −0.3 |
|   |   | 9.2 | 3520 | −13.0 | ○ | 155 | No defect | −0.4 |
|   |   | 9.2 | 3550 | −12.9 | ○ | 152 | No defect | −0.4 |
| 9 | 2.4 | 9.2 | 3440 | −13 | ○ | 165 | No defect | −0.3 |
|   |   | 9.2 | 3440 | −12.8 | ○ | 156 | No defect | −0.3 |
|   |   | 9.1 | 3520 | −12.8 | ○ | 156 | No defect | −0.4 |
|   |   | 9.1 | 3530 | −12.7 | ○ | 154 | No defect | −0.4 |
| 10 | 1.9 | 9.5 | 3540 | −14 | ○ | 162 | No defect | −0.5 |
|   |   | 9.5 | 3540 | −14.1 | ○ | 153 | No defect | −0.5 |
|   |   | 9.4 | 3560 | −14.2 | ○ | 152 | No defect | −0.6 |
|   |   | 9.4 | 3610 | −14.3 | ○ | 151 | No defect | −0.6 |
| 11 | 2.2 | 9.3 | 3450 | −14.0 | ○ | 165 | No defect | −0.3 |
|   |   | 9.3 | 3460 | −13.9 | ○ | 158 | No defect | −0.4 |
|   |   | 9.2 | 3480 | −13.8 | ○ | 157 | No defect | −0.4 |
|   |   | 9.2 | 3480 | −13.7 | ○ | 156 | No defect | −0.4 |
| 12 | 1.9 | 9.2 | 3440 | −14.1 | ○ | 150 | No defect | −0.5 |
|   |   | 9.1 | 3440 | −13.9 | ○ | 150 | No defect | −0.5 |
|   |   | 9.1 | 3450 | −13.9 | ○ | 151 | No defect | −0.6 |
|   |   | 9.2 | 3450 | −13.8 | ○ | 152 | No defect | −0.6 |

[1]Samples marked '*' are out of the scope of the present invention.
[2]A: Ba, Ca, B: Ti
[3]C2/C1 raito of the Si concentration C1 in the interfacial grain boundary and the Si concentration C2 in the triple point grain boundary.
[4]MTTF: 125° C., 9.45 V, 1000 hours
[5]Resistance evaluation of grain boundary phase by an alternating current impedance method.

As being made clear from Table 2, in the case of the samples No. 8 to 12 for which glass powders with an aluminum content of 0.1% by mass or lower was used and prescribed amounts of a barium carbonate powder was added together with a dielectric powder, in which the Si—Ba—O compound was formed in the triple point grain boundaries in the dielectric layers, and which had 5% or higher ratio of the triple point grain boundaries where the Si—Ba—O compound existed in the entire triple point grain boundaries per unit surface area of the dielectric layers, the relative permittivity was 3200 or higher in the entire temperature range of the sintering temperature of 1150 to 1200° C., the temperature property was in a range of −15% at 125° C., the dielectric breakdown voltage (BDV) was 150V or higher, no defect was caused in the highly accelerated life test (125° C., 9.45 V, 1000 hours), and the resistance variation ratio was −0.6%/ min. or lower by the AC impedance method.

Particularly, in the case of the samples No. 8, 9 and 11, for which 0.43 to 0.6% by mass of the barium carbonate powder with a specific surface area of 12 to 14 m²/g was used, the resistance variation ratio was within −0.5%/min. before and after the high temperature load treatment in a sintering temperature.

The invention claimed is:

1. A multilayer ceramic capacitor comprising a capacitor body composed by alternately layering dielectric layers and inner electrode layers,
wherein each of said dielectric layers comprises the following conditions (a) and (b):
(a) comprising a plurality of crystal particles, and grain boundary phases comprising interfacial grain boundaries and triple point grain boundaries formed among a plurality of the crystal particles adjacent to one another; and
(b) Si—Ba—O compound being formed in 5% or more of the triple point grain boundaries in the entire triple point grain boundaries per unit surface area of the dielectric layer.

2. The multilayer ceramic capacitor according to claim 1, wherein in unit surface area of the dielectric layer, the ratio ($C_2/C_1$) of a Si concentration $C_1$ in the interfacial grain boundaries and a Si concentration $C_2$ in the triple point grain boundaries is 2 or higher.

3. The multilayer ceramic capacitor according to claim 1, wherein the crystal particles are barium titanate crystal particles with different Ca component concentrations, and the barium titanate crystal particles satisfy the relation A/B≧1.003 by mole ratio in the case barium or barium and Ca is defined as A site, and titanium is defined as B site.

4. The multilayer ceramic capacitor according to claim 3, wherein the barium titanate crystal particles comprises BT crystal particles with Ca component concentration of 0.2% by atom or lower, and BCT crystal particles with a Ca component concentration of 0.4% by atom or higher, and in the case barium or barium and Ca is defined as A site and titanium is defined as B site in the BCT crystal particles, the A/B ratio by mole satisfies A/B≧1.003.

5. The multilayer ceramic capacitor according to claim 1, wherein the resistance variation ratio in the grain boundary phases in the dielectric layers before and after a treatment of the highly accelerated life test by an AC impedance method is ±0.7%/min. or lower.

6. A method for producing a multilayer ceramic capacitor, comprising the steps of:
forming a green sheet by adding oxides of Mg, rare earth elements, and Mn, glass powder containing 0.1% by mass or less of alumina, barium carbonate powder, and an organic resin into dielectric powder mixing of a perovskite type barium titanate powder (BCT powder) wherein a portion of A site is replace with Ca, and a perovskite barium titanate powder (BT) containing no substituent Ca;
forming a green body of a capacitor body composed by alternately laminating the green sheets and inner electrode patterns; and sintering the green body of the capacitor body;
wherein in the case the amount of barium and Ca is defined as A, and the amount of titanium is defined as B in the BCT powder, the A/B ratio by mole satisfies A/B≧1.003;
wherein 0.7 to 2 parts by mass of glass powder is added to 100 parts by mass of the dielectric powder; and
wherein 0.01 to 1 parts by mass of the barium carbonate powder is added to 100 parts by mass of the dielectric powder.

7. The method for producing the multilayer ceramic capacitor according to claim 6, wherein the content of alumina contained in the glass is 0.08% by mass or lower.

8. The method for producing the multilayer ceramic capacitor according to claim 6, wherein the ratio ($W_{BCT}/W_{BT}$) is in a range from 0.95 to 1.05 in the case $W_{BCT}$ denotes the BCT powder amount, and $W_{BT}$ denotes the BT powder amount.

* * * * *